(12) United States Patent
Della Pepa

(10) Patent No.: US 9,850,668 B2
(45) Date of Patent: Dec. 26, 2017

(54) COMPOSITE TILE, CONNECTION PIECE, SYSTEM TO BE LAID, AND METHOD FOR THE PRODUCTION OF A COMPOSITE TILE

(75) Inventor: Tomas Della Pepa, Limburgerhof (DE)

(73) Assignee: Hans Meyer, Ludwigshafen (DE)

( * ) Notice: Subject to any disclaimer, the term of this patent is extended or adjusted under 35 U.S.C. 154(b) by 0 days.

(21) Appl. No.: 14/002,318

(22) PCT Filed: Mar. 1, 2012

(86) PCT No.: PCT/EP2012/053567
§ 371 (c)(1),
(2), (4) Date: Nov. 5, 2013

(87) PCT Pub. No.: WO2012/117074
PCT Pub. Date: Sep. 7, 2012

(65) Prior Publication Data
US 2014/0057076 A1    Feb. 27, 2014

(30) Foreign Application Priority Data
Mar. 1, 2011    (DE) .................. 10 2011 004 893

(51) Int. Cl.
*E04F 15/02*    (2006.01)
*E04F 13/08*    (2006.01)
(Continued)

(52) U.S. Cl.
CPC ............ *E04F 13/0894* (2013.01); *B32B 3/02* (2013.01); *B32B 3/06* (2013.01); *B32B 3/26* (2013.01);
(Continued)

(58) Field of Classification Search
CPC . E04F 15/02; E04F 12/02022; E04F 13/0878; E04F 13/0889; E04F 13/0894;
(Continued)

(56) References Cited

U.S. PATENT DOCUMENTS 3,602,111 A * 8/1971 Laguardia Clemente .................. E01O 5/00 404/41
3,657,852 A * 4/1972 Worthington ........... E04F 15/02 52/392

(Continued)

FOREIGN PATENT DOCUMENTS

AU    2010101323 A1    1/2011
DE    3929676 C2    3/1991
(Continued)

OTHER PUBLICATIONS machine translation of DE 202004002966 U1, retrieved Mar. 2016.*
(Continued)

*Primary Examiner* — Alexander Thomas
(74) *Attorney, Agent, or Firm* — Mannava & Kang, P.C.

(57) ABSTRACT

The invention relates to a composite tile for an installation system, more particularly for the production of a floor covering or wall covering, comprising a tile of a floor covering or wall covering and a backing disposed on the lay-on face of the tile. The invention also relates to a connecting element for the connection of two composite tiles and to an installation system composed of composite tiles and also to a method for the fabrication of a composite tile. The backing consists of a fiber composite material, more particularly fiber cement.

12 Claims, 7 Drawing Sheets

(51) Int. Cl.
| | |
|---|---|
| *B32B 3/02* | (2006.01) |
| *B32B 3/06* | (2006.01) |
| *B32B 9/00* | (2006.01) |
| *B32B 9/04* | (2006.01) |
| *B32B 13/02* | (2006.01) |
| *B32B 13/04* | (2006.01) |
| *E04F 13/14* | (2006.01) |
| *E04F 13/16* | (2006.01) |
| *E04F 15/08* | (2006.01) |
| *E04F 15/14* | (2006.01) |
| *E04F 15/18* | (2006.01) |
| *E04F 15/20* | (2006.01) |
| *B32B 3/26* | (2006.01) |
| *B32B 3/30* | (2006.01) |
| *B32B 7/12* | (2006.01) |

(52) U.S. Cl.
CPC .............. *B32B 3/266* (2013.01); *B32B 3/30* (2013.01); *B32B 7/12* (2013.01); *B32B 9/002* (2013.01); *B32B 9/005* (2013.01); *B32B 9/04* (2013.01); *B32B 13/02* (2013.01); *B32B 13/042* (2013.01); *B32B 13/045* (2013.01); *E04F 13/0876* (2013.01); *E04F 13/0878* (2013.01); *E04F 13/0892* (2013.01); *E04F 13/0898* (2013.01); *E04F 13/14* (2013.01); *E04F 13/142* (2013.01); *E04F 13/144* (2013.01); *E04F 13/145* (2013.01); *E04F 13/16* (2013.01); *E04F 15/02038* (2013.01); *E04F 15/02044* (2013.01); *E04F 15/02188* (2013.01); *E04F 15/085* (2013.01); *E04F 15/142* (2013.01); *E04F 15/181* (2013.01); *E04F 15/185* (2013.01); *E04F 15/206* (2013.01); *B32B 2266/025* (2013.01); *B32B 2307/102* (2013.01); *B32B 2307/3065* (2013.01); *B32B 2419/00* (2013.01); *B32B 2607/00* (2013.01); *E04F 2201/022* (2013.01); *E04F 2201/0523* (2013.01); *Y10T 156/10* (2015.01); *Y10T 428/24331* (2015.01); *Y10T 428/24612* (2015.01); *Y10T 428/249982* (2015.04)

(58) Field of Classification Search
CPC .. E04F 13/142; E04F 13/144; E04F 2201/095
USPC ..................................... 428/49, 60; 52/591.3
See application file for complete search history.

(56) References Cited

U.S. PATENT DOCUMENTS

| | | | |
|---|---|---|---|
| 4,090,338 A * | 5/1978 | Bourgade | E04F 15/022 52/392 |
| 4,599,841 A | 7/1986 | Haid | |
| 4,840,825 A * | 6/1989 | Aristodimou | 428/77 |
| 6,647,684 B1 | 11/2003 | Gank | |
| 6,660,384 B1 * | 12/2003 | Segura et al. | 428/413 |
| 2004/0139679 A1 | 7/2004 | Della Pepa | |
| 2005/0183370 A1 * | 8/2005 | Cripps | E04F 15/105 52/591.5 |
| 2005/0279574 A1 | 12/2005 | Halterbeck et al. | |
| 2006/0230701 A1 * | 10/2006 | Pepa | 52/592.1 |
| 2007/0102108 A1 * | 5/2007 | Zheng | B27D 1/04 156/272.2 |
| 2008/0209831 A1 | 9/2008 | Rinsche | |
| 2011/0179735 A1 | 7/2011 | Paetrow et al. | |
| 2011/0258944 A1 * | 10/2011 | Radoane | 52/62 |

FOREIGN PATENT DOCUMENTS

| | | |
|---|---|---|
| DE | 20009717 U1 | 11/2000 |
| DE | 19962812 A1 | 6/2001 |
| DE | 10158215 A1 | 8/2002 |
| DE | 202004002966 U1 | 5/2004 |
| DE | 60010109 T2 | 10/2004 |
| DE | 10355788 A1 | 6/2005 |
| DE | 102004018550 A1 | 11/2005 |
| DE | 102005021662 A1 | 11/2006 |
| DE | 202009008947 U1 | 9/2009 |
| EP | 1607544 A2 | 12/2005 |
| WO | WO-0125563 A1 | 4/2001 |
| WO | WO-2010012116 A1 | 2/2010 |
| WO | WO-2011115514 A2 | 9/2011 |

OTHER PUBLICATIONS

International Search Report and Written Opinion for PCT/EP2012/053567, Sep. 24, 2012, European Patent and Trademark Office.
"Faserplatte", 2002.

\* cited by examiner

COMPOSITE TILE, CONNECTION PIECE, SYSTEM TO BE LAID, AND METHOD FOR THE PRODUCTION OF A COMPOSITE TILE

PRIORITY

The present application claims priority under 35 U.S.C. §371 to PCT Application PCT/EP2012/053567, filed on Mar. 1, 2012, which claims priority to German Patent Application No. 10 2011 004 893.6, filed on Mar. 1, 2011, the disclosures of which are hereby incorporated by reference in their entireties.

TECHNICAL FIELD

The invention relates to a composite tile for an installation system, more particularly for the production of a floor. Covering or wall covering, comprising a tile of a floor covering or wall covering and a backing located at the lay-on side of the tile. The invention also relates to a connecting element for the connection of two composite tiles and to an installation system composed of composite tiles and also to a method for the fabrication of a composite tile.

PRIOR ART

DE 101 58 215 A1 discloses an installation system for tiles for creating a covering for floors, walls, or ceilings, in which the tiles are provided with supporting frames, on which the tiles rest over at least part of their surface. The tile and the supporting frame can be glued to each other to form a unit. This suffers from the drawback that the supporting frame is relatively complex to produce and that the tile must be exactly calibrated as to size with respect to the supporting frame or that for a large number of tile sizes a large number of mating supporting frames must be kept in stock.

In addition, DE 199 62 812 A1 discloses a tile to which border profiles are adhesively attached and which additionally has an insulating layer on the bottom-side of the tile.

DE 39 29 676 C2 discloses that it is prior practice to use, as supporting board for a cavity floor, a gypsum plaster board, a gypsum fiber board, a chip board, or a cement fiber board, which is sufficiently rigid and thick to make it capable of being walked on.

DE 20 2004 002 966 U1 discloses a loosely laid natural stone flag flooring, in which a groove is present in lateral faces of the flags and a joint spacer of plastics material is disposed between adjacent flags, which joint spacer carries a clamping rail on each side, which clamping rails are held in the grooves by a clamping force. A resilient material can be provided for this purpose.

In addition, U.S. Pat. No. 4,599,841 discloses a joint spacer for introduction into the grooves disposed in the lateral faces of adjacent floor tiles.

SUMMARY OF THE INVENTION

A composite tile of the invention for an installation system, more particularly for the production of a floor covering or wall covering, comprises a tile of a floor covering or wall covering and a backing disposed on the lay-on face of the tile, wherein the backing consists of a fiber composite material, more particularly fiber concrete.

The term "fiber composite material" should be understood to mean a composite material of tension-proof organic or inorganic fibers embedded in a compression-proof organic or inorganic material, with the tensile strength of the material being much lower than that of the fibers.

A particularly suitable fiber composite material is fiber concrete, which can consist of cement and tension-proof inorganic fibers such as asbestos, glass, or carbon fibers or organic fibers of cellulose, polyethylene or polyamide.

Fiber concrete tiles can be produced so as to be watertight and, due to their entrained air content, frost-resistant and moisture regulating and they are therefore readily applicable in wet areas. They show high strength, more particularly a high compressive strength. A further possible property of fiber concrete is that it is antistatic and diffusion-tight. In addition to providing good noise protection, the fire protection properties are also excellent and, moreover, fiber concrete tiles can be designed as to be environmentally friendly, and the composite tile is thus recyclable. In all, fiber concrete tiles are to be regarded as being durable and cheap.

An important advantage of the system described consists in that the backing can be produced in a form matching the size of any already available tiles without further difficulty, since the backing can be cut from a large piece of flat material having the desired thickness and this cutting operation can be carried out on a numerically controlled cutting machine. Thus it is possible, at no great effort, to provide a backing that matches each caliber, and it is even possible to provide off-specification batches of tiles lying outside the permissible tolerances with a matching backing and to produce a floor covering composed of the tiles of such an off-specification batch.

Advantageously, the tile can be one made of ceramics, glass, artificial stone, or natural stone and can be attached to the backing by means of an adhesive.

The adhesive used can be a polymer-modified cementitious adhesive. Basically, other adhesives can also be used for the adhesive bond, such as hot melt adhesives, PU adhesives, and 2-component adhesives.

Advantageously, the backing can comprise an insulation for footstep sound on its side remote from the tile, more particularly an insulating layer of expanded polyethylene sheet or interspaced elastically deformable nubs, more particularly of silicone or an elastomeric material.

The use of a footstep sound insulating material can reduce the footstep sound and if an insulating layer is employed, it may possibly provide improved thermal insulation. When interspaced nubs are used, a drainage can be achieved when the composite tile is laid outdoors.

Advantageously, the insulation can be directly laminated to the backing, more particularly by wet lamination with wet adhesive, dry lamination with dry adhesive or thermolamination without adhesive under the action of heat or pressure.

Advantageously, the tile can lay holohedral on the backing, in order to achieve maximum stiffening of the tile.

Advantageously, the backing can have, in its boundary area, both protrusions extending laterally beyond the tile and recesses extending laterally beneath the tile, wherein the protrusions and recesses of the backing extend laterally beyond and beneath the tile, respectively, to such an extent that the protrusions of adjoining composite tiles engage in the recesses of the complementary composite tile and are thus situated beneath said complementary composite tile.

This arrangement of the backing makes it possible to assemble the tiles to form a floor covering or wall covering that is stabilized beyond the joint between adjacent tiles.

The protrusions and recesses can be disposed in the side regions of the backing such that a protrusion on one side of the backing corresponds to a recess on the opposite side of the backing. By this means, a modular system having a specified installation direction can be provided.

According to a development, the protrusions and recesses can be formed such that they always have a tolerance when joined to an identical tile.

The provision of a tolerance makes it possible to use the same backing for different sizes of tiles, professionally also referred to as their "caliber". The tolerance provided then permits an offset of the composite tiles relatively to each other during installation, since alignment of the composite tiles no longer takes place via the recesses and protrusions but installability remains ensured. A tolerance compensation of slight differences in caliber of the tiles can also take place via this gap.

Advantageously, the protrusions can comprise mounting holes in a region extending laterally beyond the tile. This makes it possible to fix the composite tile to the underground during installation thereof, for example by screwing, and thus to cover a wall herewith.

Furthermore, each lateral face can comprise a groove extending along the composite tile at a distance from the top side of the composite tile and at a distance from the bottom-side of the composite tile. This groove serves to accommodate a jointing profile.

The jointing profile inserted into the groove ensures that a composite tile can be joined to its adjacent composite tile such that a covering formed from a plurality of composite tiles can be stabilized thereby.

Advantageously, the groove can be disposed exclusively in the backing or in the tile or it can be simultaneous formed in part of the tile and in part of the backing.

The arrangement of the groove only in the backing has the advantage that the tile is not weakened in terms of its thickness and that machining of the backing is much easier than machining of the harder tile. The arrangement thereof in the tile only has the advantage that the backing is not weakened. The arrangement of the groove both in the backing and in the tile has the advantage that the overall thickness of the composite tile can be minimized.

In order to avoid vertical misalignment between one composite tile and its adjacent composite tile, the groove can be calibrated against the top side of the composite tile.

Advantageously, the connecting element can be in the form of an inverted capital T, wherein the crosspiece of the T can comprise elastic lips at its two outer ends, which lips are bent inwardly back towards the leg of the T.

These lips serve to fix the connecting element in the groove. Basically, the lips can be replaced by elastic protrusions, nubs, or strips, which become deformed when the connecting element is inserted into in a groove and thus produce frictional engagement. However, the special advantage of the lips is their additional barb-like effect.

Furthermore, the leg of the capital T can have a widened portion disposed at its end remote from the crosspiece and consisting of a sealing material. In this way the joint between two adjacent composite tiles is elastically sealed.

Advantageously, the crosspiece bearing the lips and the sealing material can be of rigid plastics material, more particularly PVC and the sealing material can be of flexible plastics material, more particularly TPE.

A further object of the present invention is an installation system for the production of a floor covering or wall covering using composite tiles as described above. Such floor coverings or wall coverings can be quickly installed and removed.

For the purpose of stabilizing the floor covering or wall covering, a connecting element as described in one of the claims above can be provided between adjacent composite tiles.

Advantageously, the installation system can comprise composite tiles having a groove in the lateral face of the composite tile, which groove is at least as deep as the recess of the backing. By this means, it is possible to remove any adhesive located on the protrusions of the backing and on the tile in the region of the recesses for the purpose of attaching the backing to the tile, which adhesive would otherwise hinder the introducing of a joining profile.

It is a further object of the present invention to provide a method for the fabrication of a composite tile as described above, wherein the composite tile is to be formed from a tile of a floor covering or wall covering and a backing to be provided on the lay-on face of the tile. For the purpose of connecting the tile to the backing, an adhesive is roller coated on to at least one side of the tile or the backing. This can be carried out using a commercial roller coating machine, such as that marketed by Axel Wirth Maschinen GmbH, 73447 Oberkochen, Aalener Str. 76/80. The tile and the backing are then be aligned to each other and possibly joined together under the action of pressure and/or heat.

Another object of the present invention is to provide a method for the fabrication of a composite tile as described above, in which the composite tile is formed from a tile pertaining to a floor covering or wall covering and a backing to be provided on the lay-on face of the tile. In order to join the composite tiles to each other via a joining profile, a groove is formed in a lateral face of the composite tile at a specified distance from the usable surface of the composite tile. Preferably, such a groove is formed in each lateral face of the tile.

As already explained, this specified distance from the usable surface of the tile allows for even alignment of the composite tiles to each other in terms of height.

Advantageously, the composite tile can be placed on a workpiece table with its usable surface facing downwardly and the groove can be formed at a specified distance from the workpiece table. By this means, it is possible to form the groove at a specified distance from the useable surface of the tile in a simple manner.

BRIEF DESCRIPTION OF THE DRAWINGS

The method of the invention is explained below with reference to the drawings, in which.

EXEMPLARY EMBODIMENTS OF THE INVENTION

Figure 1:
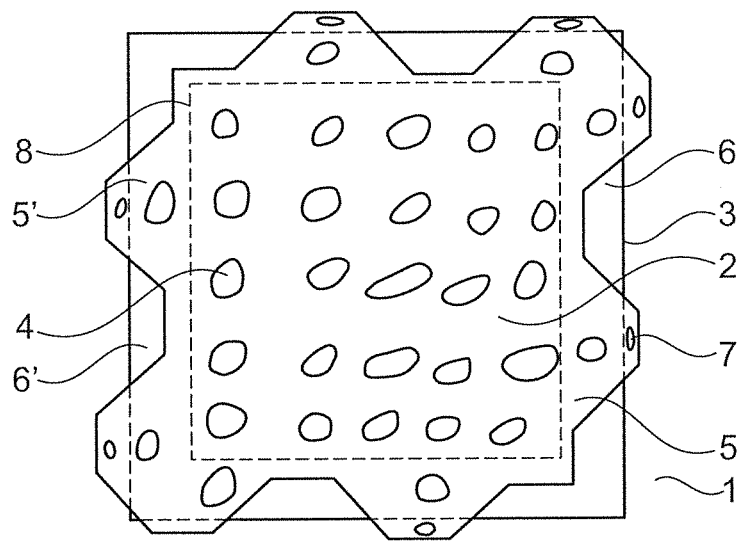
FIG. 1 shows a first backing for a composite tile of the invention.

FIG. 1 shows a composite tile of the invention 1 as viewed on the lay-on face of the composite tile 1, which tile comprises a first backing 2 made of a fiber composite material, more particularly of fiber concrete, wherein the side of the backing 2 remote from its lay-on face is connected to the lay-on face of a tile 3, the contour of which is depicted by broken lines in regions where it is hidden by the backing. The tile can be one made of ceramics, glass, artificial stone, or natural stone.

The backing 2 comprises, on its lay-on face remote from the tile 3, an insulation for footstep sound, which insulation is in the form of interspaced elastically deformable nubs 4, which may be made of silicone. The nubs 4 are distributed over the entire lay-on face of the backing 2.

The backing 2 comprises along its boundary area both protrusions 5 laterally beyond the tile 3 and recesses 6 extending laterally beneath the tile 3. Said protrusions 5 and recesses 6 of the backing 2 protrude laterally beyond the tile 3 and recede laterally beneath the same, respectively, to such an extent that the protrusions of adjoining composite tiles engage in the recesses of the respective complementary composite tile and are thus situated beneath said respective complementary composite tile.

In the exemplary embodiment illustrated, there are disposed two protrusions 5 and two recesses 6 on each side, with a protrusion 5 at one side of the backing 2 corresponding to a recess 6' at the opposite side of the backing 2 and a recess 6 at one side of the backing 2 corresponding to a protrusion 5' at the opposite side of the backing 2.

The protrusions 5, 5' comprise, in a region protruding laterally beyond the tile 3, mounting holes 7, by means of which the composite tile can be fixed during installation to the underground to be covered.

Furthermore, there is illustrated the course of a groove 8 extending along each lateral face of the composite tile at a distance from the top side of the composite tile and at a distance from the bottom-side of the composite tile. This groove is explained in detail below and serves to accommodate a jointing profile described below.

Figure 2:
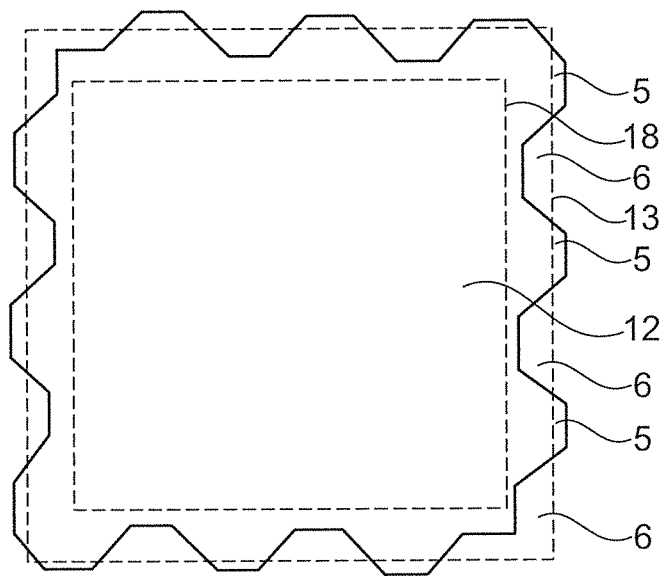
FIG. 2 shows a second backing for a further composite tile of the invention.

FIG. 2 shows a second backing 12 for a further composite tile of the invention, wherein the backing comprises three protrusions 5 and three recesses 6 along each of its boundary areas. The position of the tile 3 (not shown) as indicated in FIG. 1 is depicted by the outer contour 13, while the inner contour 18 shows the position of the groove 8 as indicated in FIG. 1.

Figure 3:
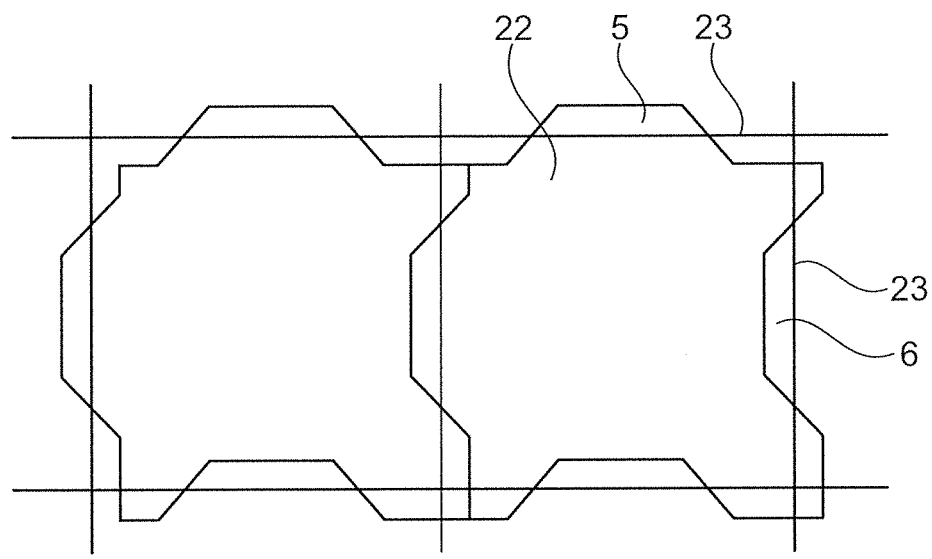
FIG. 3 shows a third backing for a further composite tile of the invention as part of a floor covering or wall covering.

FIG. 3 shows a third backing 22 for a further composite tile of the invention as part of a floor covering or wall covering, wherein the backing 22 has, in its boundary areas, in each case only one complete protrusion 5 or only one complete recess 6. The position of the tile 3 (not shown) as indicated in FIG. 1 is depicted by the outer contour 23.

Figure 4:
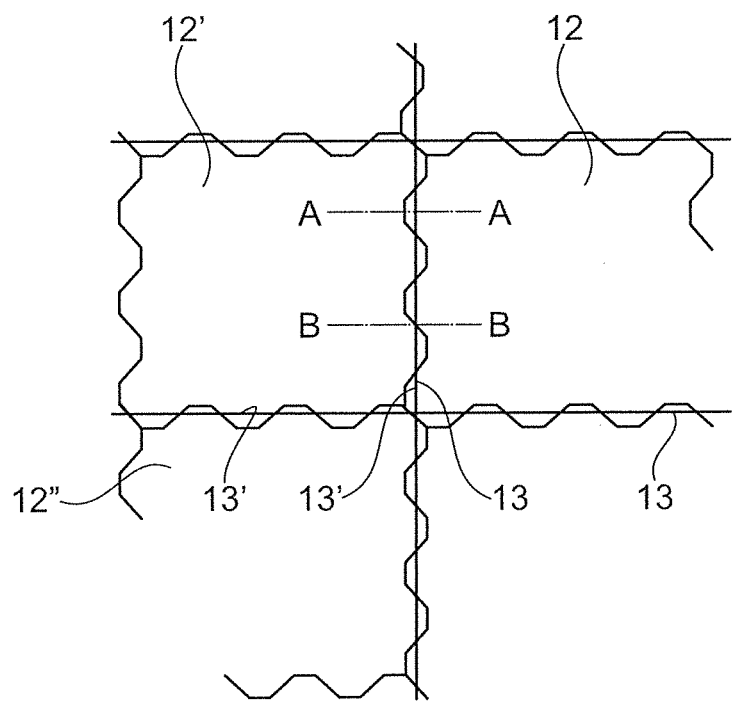
FIG. 4 shows the second backing as shown in FIG. 2 as part of a floor covering or wall covering.

FIG. 4 shows the second backing 12 for a composite tile of the invention as shown in FIG. 2 as part of a floor covering or wall covering, that is to say, together with adjacent composite tiles with their backings 12', 12". The position of the associated tiles (not shown) is depicted by the outer contours 13, 13".

Figure 5:
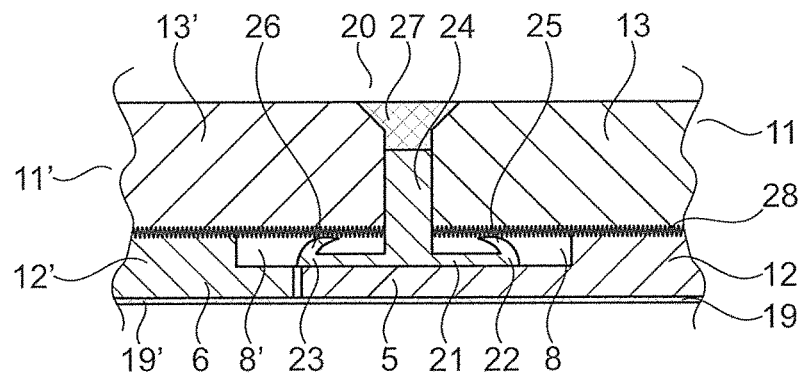
FIG. 5 shows a first embodiment of a lateral face of a composite tile of the invention consisting of a backing with a tile with an inserted connecting element in the form of a section taken along the line AA as shown in FIG. 4.

FIG. 5 shows a first embodiment of two joined composite tiles of the invention 11, 11' in the form of a section taken along the line AA in FIG. 4. The composite tiles 11, 11" are composed of a backing 12, 12" according to FIGS. 2 and 4 and a tile 13, 13", wherein an insulation in the form of an insulating layer 19, 19' is attached to the lay-on face of the backing 12, 12". The protrusion 5 of the backing 12 of the composite tile 11 protrudes laterally beyond the tile 13 and rests laterally flush against the recess 6 of the backing 11'.

The two composite tiles 11, 11" are joined via a connecting element 20, which corresponds in cross-section to the shape of an inverted capital T and which is inserted into a groove 8 on a lateral face of the composite tiles 11, 11".

The crosspiece 21 of the T comprises at its two outer ends 22, 23 elastic lips 25, 26 bent inwardly back at an angle towards the leg 24 of the T, as regarded from the ends 22, 23. These lips serve to fix the connecting element in the groove 8, 8'.

The leg 24 of the capital T, through its thickness, determines the distance between two adjacent composite tiles 11, 11'. The leg 24 of the capital T comprises at its end remote from the crosspiece 21 a widened portion 27 composed of a sealing material. This ensures that the joint between two adjacent composite tiles 11, 11' is elastically sealed from the top side of the composite tiles 11, 11'.

In this embodiment, the groove 8, 8 is situated exclusively in the backing 12, 12'. The lay-on face of the tile 13, 13' provided with an adhesive 28 forms a wall of the groove. An alternative possibility is to arrange the groove such that the adhesive on the lay-on face of the tile is removed during creation of the groove.

Figure 6:
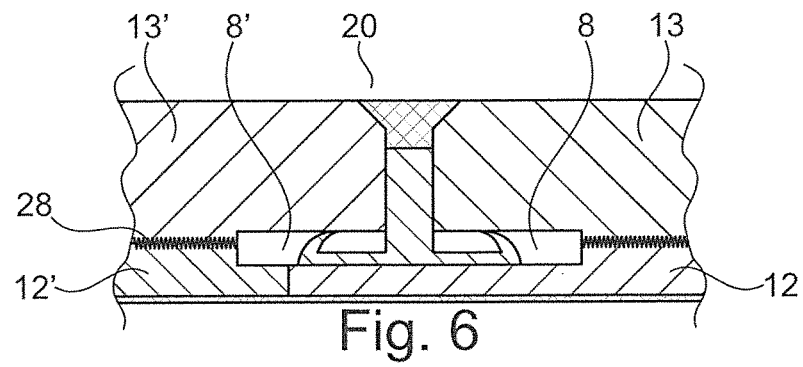
FIG. 6 shows a second embodiment of a lateral face of a composite tile of the invention in the form of a section taken along the line AA as shown in FIG. 4.

FIG. 6 shows a second embodiment of a lateral face of a composite tile of the invention in the form of a section taken along the line AA as shown in FIG. 4, wherein, unlike FIG. 5, the groove 8, 8' is situated both in the tile 13, 13' and in the backing 12, 12'. This has the advantage that the adhesive 28 has no influence on the hold and positioning of the connecting element 20.

Figure 7:
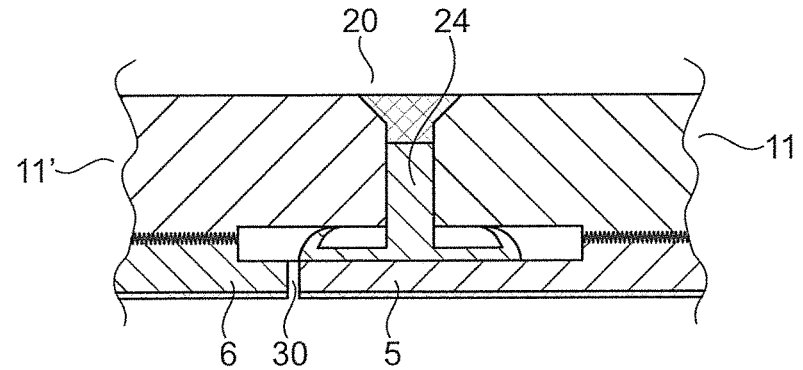
FIG. 7 shows a third embodiment of a lateral face of a composite tile of the invention in the form of a section taken along the line AA as shown in FIG. 4.

FIG. 7 shows a third embodiment of a lateral face of a composite tile of the invention in the form of a section taken along the line AA as shown in FIG. 4, starting from the second embodiment as shown in FIG. 6. There is illustrated a gap 30 between the recess 6 and the protrusion 5, and the distance between the composite tiles 11, 11' is solely limited by the leg 24 of the connecting element 20.

Figure 8:
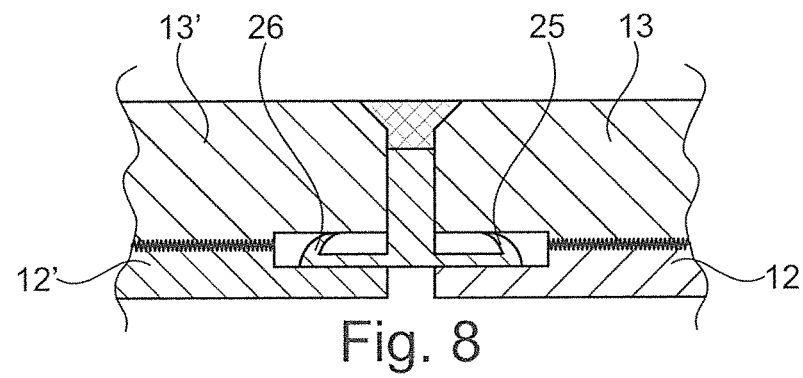
FIG. 8 shows the third embodiment in the form of a section taken along the line BB as shown in FIG. 4.

FIG. 8 shows an embodiment of a lateral face of a composite tile of the invention in the form of a section taken along the line BB as shown in FIG. 4, wherein the backing 12, 12' comprise neither a protrusion nor a recess but are laterally flush with the tile 13, 13'. The insulating layer has been omitted for the sake of simplicity.

It is seen that the connecting element at least partially stabilizes both composite tiles 11, 11' simultaneously and levels them, wherein a small degree of tolerance is allowed due to the elasticity of the lips.

Figure 9:
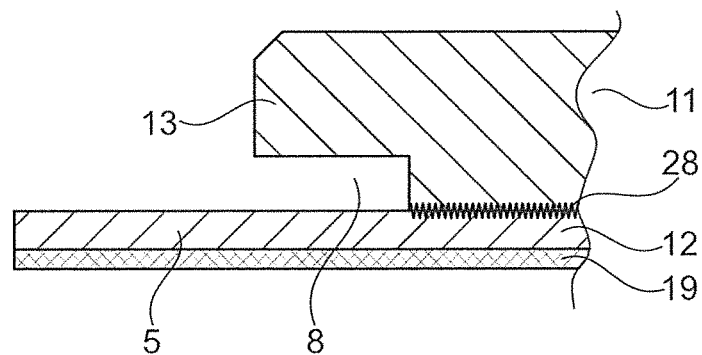
FIG. 9 shows a fourth embodiment of a lateral face of a composite tile of the invention as one side of the section taken along the line AA as shown in FIG. 4.

FIG. 9 shows a fourth embodiment of a lateral face of a composite tile of the invention 11 as one side of the section taken along the line AA as shown in FIG. 4, wherein the groove 8 is disposed in the tile 13 such that the top side of the backing 12 forms a groove wall. During creation of the groove, excess adhesive can be removed from the top side of the backing so as to ensure that a connecting element (not shown) can be inserted into the groove without difficulty. The composite tile 11 comprises an insulating layer 19 on its lay-on face.

Figure 10:
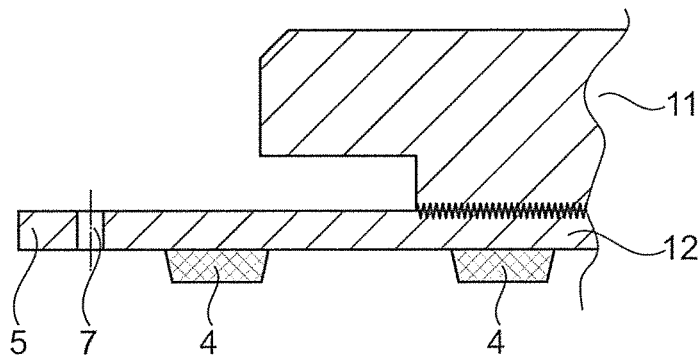
FIG. 10 shows a further embodiment of a composite tile of the invention in the form of a section taken along the line AA as shown in FIG. 4 exhibiting nubs.

FIG. 10 shows the fourth embodiment as illustrated in FIG. 9, in which the composite tile 11 comprises, in place of the insulating layer 19 shown in FIG. 9, the nubs 4 illustrated in FIG. 1 and the hole 7 in the protrusion 5 of the backing 12. Of course, the hole 7 can also be provided in a composite tile having an insulating layer. The nubs 4, if composed of silicone, can be simply applied to the backing, since silicone is self-adhesive and will adhere to the backing.

Figure 11:
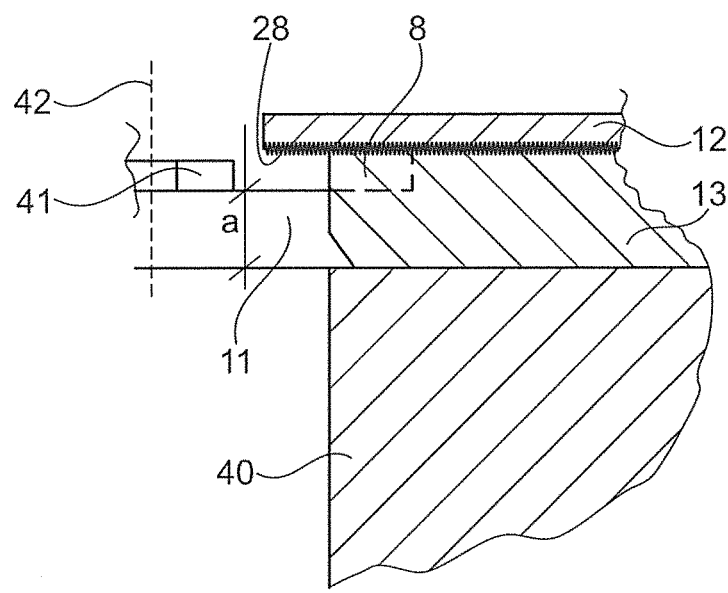
FIG. 11 shows an arrangement of the composite tile of the invention for the formation of a groove in a lateral face according to the fourth embodiment as shown in FIG. 9.

FIG. 11 shows an arrangement of the composite tile of the invention 11 with its useable surface facing down on a workpiece table 40, such that a tool 41 can be inserted into the lateral face of the composite tile 11 in order to create the groove 8 at a specified distance from the useable surface of the tile 13. The alignment of the position of the groove 8 relative to the useable surface of the composite tile 11 has as a result that, provided the useable surfaces are uniform, the composite tiles will always be aligned to each other at the same level independently of the quality of the backing 12 or of the adhesive layer 28.

A suitable tool 41 is a saw blade or a grinding wheel having an axis of rotation 42 perpendicular to the contact surface of the workpiece table or to the useable surface of the composite tile, but it may alternatively be a milling cutter or finger sander having a workpiece axis that is parallel to the contact surface on the workpiece table or to the useable surface of the composite tile.

Figure 12:
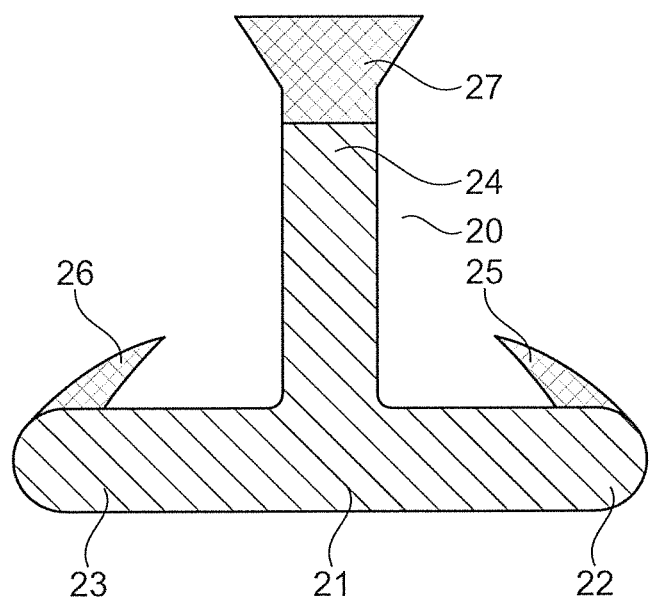
FIG. 12 is a section taken through the connecting element as shown in FIGS. 5 to 8, in detail.

FIG. 12 shows a section through the connecting element as shown in FIGS. 5 to 9, in detail. The crosspiece 21 of the T comprises at its two outer ends 22, 23 elastic lips 25, 26 bent inwardly back at an angle towards the leg 24 of the T as regarded from the ends 22, 23. These lips make it possible to fix the connecting element, since the lips can be deformed towards the crosspiece. The leg 24 of the capital T comprises, at its end remote from the crosspiece 21, a widened portion 27 composed of a sealing material.

The crosspiece bearing the lips and the leg bearing the sealing material are composed of rigid plastics or thermosetting plastics materials, more particularly PVC, and the lips and the sealing material are composed of flexible plastics materials or elastomers, more particularly TPE. The production of the connecting element can be carried out using a coextrusion method in which both plastics materials are processed simultaneously. By this means, rigid and flexible plastics can be combined to a profile and it is further possible to combine plastics materials of different colors.

Figure 13:
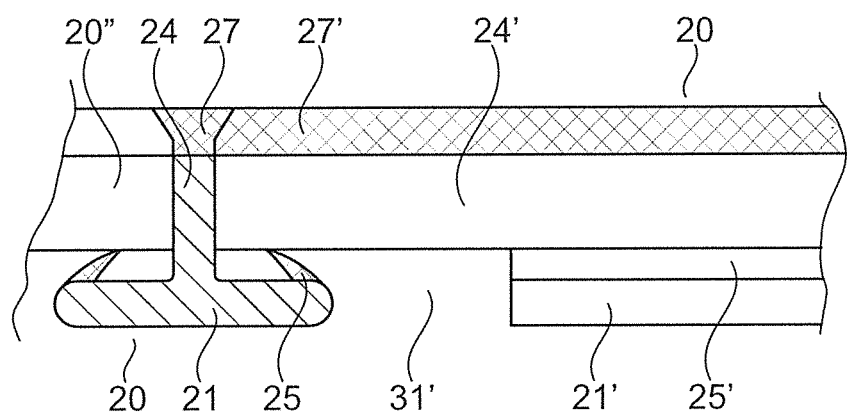
FIG. 13 is a diagrammatic representation of plain abutting connecting elements as shown in FIG. 12.

FIG. 13 is a diagrammatic representation of abutting connecting elements 20 as shown in FIG. 12, wherein laterally disposed connecting elements 20', 20'' extend away from the connecting elements 20 extending into the drawing plane. The connecting element 20 consists, as described above, of the crosspiece 21, the lips 25, 26 disposed on the crosspiece, the leg 24 connected to the crosspiece, and the sealing portion 27 attached thereto. In addition, the laterally disposed connecting profile 20' comprises these functional portions, of which the crosspiece 21', the lip 25 disposed on the crosspiece, the leg 24 connected to the crosspiece, and the sealing portion 27 attached thereto are illustrated. In order to achieve perfect adjoining of the connecting elements 20, 20', the laterally disposed connecting element 20' is notched in the region of the crosspiece 21' and the leg 24', such that a notch 31 has formed, in which the crosspiece 21 and the lip 5 of the connecting element 20 are disposed.

This method of jointing the connecting elements makes it possible for a connecting element to extend over a plurality of composite tiles and to stabilize them as a whole, such that the resulting floor covering can be evenly installed.

Instead of using the illustrated plain abutment joint, it is possible to employ a mitered joint.

Figure 14:
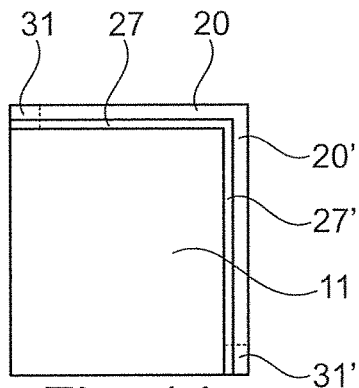
FIG. 14 is a diagrammatic representation of plain abutting connecting elements as shown in FIGS. 12 and 13 mounted on the composite tile.

FIG. 14 is a diagrammatic representation of connecting elements 20, 20' attached to the composite tile 11 by plain abutment, as shown in FIGS. 12 and 13, the protrusions of the backing not being shown for the sake of clarity. It is sufficient for the purpose of producing a floor covering or wall covering for the composite tile 11 to be provided with only one connecting element 20, 20' on two abutting sides, since the adjacent composite tile can be connected via this connecting element 20, 20' to the lateral faces that are not provided with a connecting element. Such prefabricated composite tiles then require no further connecting elements.

To ensure that the connecting element of the adjacent composite tile (not shown) can create the joint, the connecting element is provided with a notch 31, 31' at its ends facing those lateral faces with no connecting element.

Figure 15:
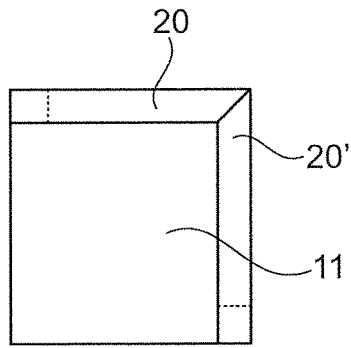
FIG. 15 is a diagrammatic representation of mitered abutting connecting elements as shown in FIG. 12 mounted on the composite tile.

FIG. 15 is a diagrammatic representation of mitered abutting connecting elements attached to the composite tile 11 in contrast to FIG. 14.

Figure 16:
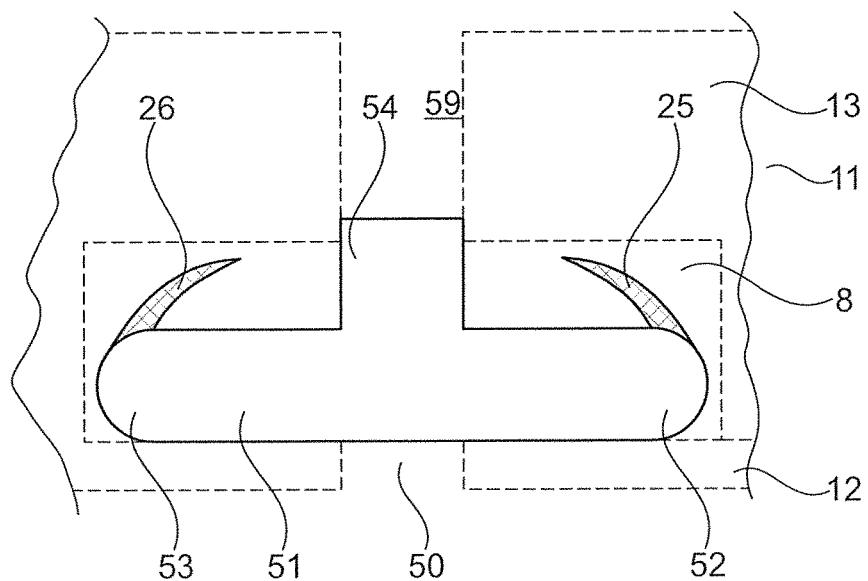
FIG. 16 is a section corresponding to section AA as shown in FIG. 4 through an alternative connecting element with no top seal, in detail.

FIG. 16 is a section through an alternative connecting element 50 having no upper sealing means, in detail, wherein two composite tiles are drawn in the form of a section taken along the line BB shown in FIG. 4. A crosspiece 51 again carries, at its ends 52, 53, the lips 25, 26, while a leg 54 extends away from the crosspiece to at least such a level at which the groove 8 in the composite tile is covered, leaving, however, a distinct distance from the usable side of the composite tile. The joint 59 formed in this manner can be filled, following installation of the composite tiles, with a commercial jointing compound in conventional manner in order to seal the joint 59. Here again, a connecting element can extend over a plurality of composite tiles and stabilize them as a whole.

Figure 17:
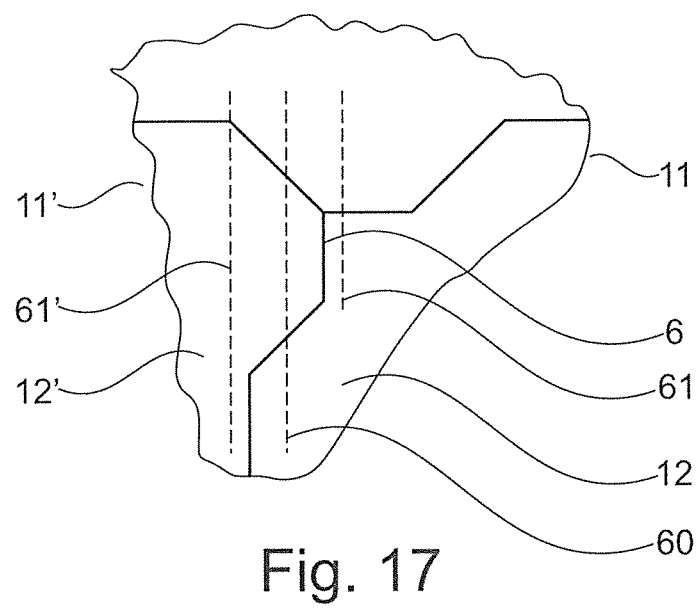
FIG. 17 is a diagrammatic representation of the embodiment showing a groove depth in the lateral face.

FIG. 17 is a diagrammatic representation of an embodiment of the depth of a groove in the lateral face with the help of to two adjacent composite tiles 11, 11' with the backing of the invention 12, 12', of which the tiles (not shown) rest against each other along the line 60, while in the case of this diagrammatic view, the sealing portion in the joint is ignored. The groove 8 as shown in FIG. 1 and FIGS. 5 to 9 extends up to the line 61, 61' and thus further than the recess 6 in the backing 11.

Figure 18:
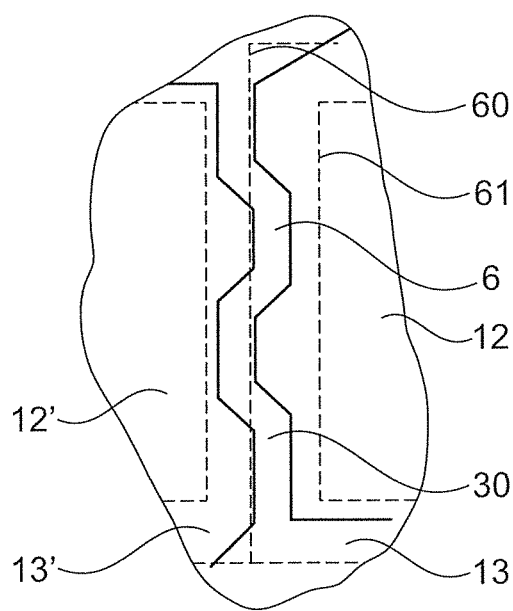
FIG. 18 illustrates the form of a joint between interspaced backings.

FIG. 18 is a diagrammatic representation corresponding to FIG. 17 in the case of the formation of a joint through interspaced backings 12, 12'. Although the tiles 13, 13' abut along the line 60, the backings 12, 12' remain interspaced and there is formed the gap 30 illustrated in FIGS. 7 and 8.

The invention claimed is:

1. An installation system with composite tiles, a composite tile of the composite tiles comprising a tile of a floor covering or wall covering, and a backing disposed on a lay-on face of the tile,
wherein the backing includes fiber cement, the tile is made of ceramics or artificial stone, and a connection with the backing is achieved by an adhesive, wherein the backing comprises along a boundary area protrusions disposed in generally a plane of the backing and extending laterally beyond the tile and recesses disposed in generally the plane of the backing and extending laterally beneath the tile, wherein the protrusions and the recesses of the backing protrude laterally beyond the tile and recede laterally beneath the tile, respectively, wherein protrusions of adjoining composite tiles engage in the recesses of the composite tile and are situated beneath the composite tile, respectively, wherein the protrusions and the recesses of the composite tile are formed to include a tolerance when joined to an identical composite tile, wherein the tolerance results in a gap between a protrusion of the composite tile and a recess of an adjacent composite tile, wherein the composite tile includes a lateral face having a groove that is situated exclusively in the backing, and wherein the groove is formed by a surface of the composite tile and a surface of the protrusion.

2. The installation system according to claim 1, wherein the adhesive is a polymer-modified cementitious adhesive.

3. The installation system according to claim 1, wherein the backing comprises an insulation for footstep sound on a side remote from the tile, wherein the insulation is an insulating layer of expanded polyethylene sheet or interspaced elastically deformable nubs formed of silicone.

4. The installation system according to claim 3, wherein the insulation is directly connected to the backing by at least one of wet lamination using wet adhesive, dry lamination using dry adhesive, and thermolamination without adhesive under an action of heat or pressure.

5. The installation system according to claim 1, wherein the protrusions and recesses of the composite tile are disposed at sides of the backing, and wherein a protrusion on one side of the backing corresponds to a recess on an opposite side of the backing.

6. The installation system according to claim 1, wherein the protrusions of the composite tile comprise mounting holes in a region extending laterally beyond the tile.

7. The installation system according to claim 1, wherein the composite tile includes the lateral face having the groove that is at least as deep as a recess of the backing.

8. A method for the production of the composite tile for the installation system according to claim 1, the method comprising:
connecting the tile to the backing by roller coating the adhesive on to at least one face of the tile and the backing.

9. The installation system according to claim 1, wherein the protrusions of adjoining composite tiles are configured to engage in the recesses of the composite tile without locking to the recesses of composite tile in a direction that is generally orthogonal to an edge of the composite tile.

10. A composite tile for an installation system, the composite tile comprising a tile of a floor covering or wall covering, and a backing disposed on a lay-on face of the tile,
wherein the backing comprises along a boundary area a plurality of protrusions disposed in generally a plane of the backing and extending laterally beyond the tile and a plurality of recesses disposed in generally the plane of the backing and extending laterally beneath the tile, and wherein the protrusions and the recesses of the backing protrude laterally beyond the tile and recede laterally beneath the tile, respectively, wherein the composite tile includes a lateral face having a groove that is situated exclusively in the backing or situated in the tile and in the backing, and wherein the groove is formed by a surface of the composite tile and a surface of a protrusion.

11. The composite tile according to claim 10, wherein the protrusions and the recesses are shaped to include a plurality of complementary acute angles.

12. An installation system with composite tiles, a composite tile of the composite tiles comprising a tile of a floor covering or wall covering, and a backing disposed on a lay-on face of the tile,
wherein the backing includes fiber cement, the tile is made of ceramics or artificial stone, and a connection with the backing is achieved by an adhesive, wherein the backing comprises along a boundary area protrusions disposed in generally a plane of the backing and extending laterally beyond the tile and recesses disposed in generally the plane of the backing and extending laterally beneath the tile, wherein the protrusions and the recesses of the backing protrude laterally beyond the tile and recede laterally beneath the tile, respectively, wherein protrusions of adjoining composite tiles engage in the recesses of the composite tile and are situated beneath the composite tile, respectively, wherein the protrusions and the recesses of the composite tile are formed to include a tolerance when joined to an identical composite tile, wherein the tolerance results in a gap between a protrusion of the composite tile and a recess of an adjacent composite tile, wherein the composite tile includes a lateral face having a groove that is situated in the tile and in the backing, and wherein the groove is formed by a surface of the composite tile and a surface of the protrusion.

* * * * *